United States Patent
Reddy et al.

(10) Patent No.: US 6,770,604 B2
(45) Date of Patent: Aug. 3, 2004

(54) HIGH TEMPERATURE VISCOSIFYING AND FLUID LOSS CONTROLLING ADDITIVES FOR WELL CEMENTS, WELL CEMENT COMPOSITIONS AND METHODS

(75) Inventors: B. Raghava Reddy, Duncan, OK (US); Wendell D. Riley, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 162 days.

(21) Appl. No.: 10/071,076

(22) Filed: Feb. 8, 2002

(65) Prior Publication Data

US 2003/0159625 A1 Aug. 28, 2003

(51) Int. Cl.$^7$ .............................. E21B 33/13; C09K 3/00
(52) U.S. Cl. .................. 507/224; 507/225; 507/226; 507/229; 507/221; 507/269; 166/293; 166/295
(58) Field of Search ................... 166/293, 295; 507/224, 225, 226, 229, 221, 269

(56) References Cited

U.S. PATENT DOCUMENTS

| | | | | |
|---|---|---|---|---|
| 4,309,523 A | | 1/1982 | Engelhardt et al. | 526/240 |
| 4,587,283 A | | 5/1986 | Hille et al. | 524/3 |
| 4,700,780 A | * | 10/1987 | Brothers | 166/293 |
| 4,806,164 A | * | 2/1989 | Brothers | 523/130 |
| 5,025,040 A | | 6/1991 | Crema et al. | 523/130 |
| 5,046,562 A | * | 9/1991 | Crema et al. | 166/293 |
| 5,116,421 A | * | 5/1992 | Ganguli | 106/823 |
| 5,153,240 A | * | 10/1992 | Stephens | 166/293 |
| 5,398,758 A | * | 3/1995 | Onan et al. | 166/292 |
| 6,138,759 A | * | 10/2000 | Chatterji et al. | 166/293 |
| 6,235,809 B1 | * | 5/2001 | DiLullo Arias et al. | 523/130 |
| 6,268,406 B1 | * | 7/2001 | Chatterji et al. | 523/130 |
| 6,465,587 B1 | | 10/2002 | Bair et al. | 526/240 |
| 6,497,283 B1 | * | 12/2002 | Eoff et al. | 166/293 |
| 6,591,910 B1 | * | 7/2003 | Chatterji et al. | 166/293 |
| 2004/0000403 A1 | * | 1/2004 | Eoff et al. | 166/293 |

FOREIGN PATENT DOCUMENTS

| EP | 1 033 378 A1 | 9/2000 | C08F/220/58 |
|---|---|---|---|

* cited by examiner

*Primary Examiner*—Philip C. Tucker
(74) *Attorney, Agent, or Firm*—Craig W. Roddy; C. Clark Dougherty, Jr.

(57) ABSTRACT

A high temperature viscosifying and fluid loss controlling additive for use in well cements, well cement compositions including the additive and methods of using the compositions are provided. The well cement compositions of this invention are comprised of a hydraulic cement, water and a viscosifying and fluid loss controlling additive comprising a mixture of a polymer comprised of at least one monomer which is calcium tolerant, anionic and disperses basic cement slurries, at least one monomer which hydrolyzes in basic cement slurries to generate anionic carboxylate groups that bind with calcium and viscosify the slurries and at least one monomer which generates non-ionic pendant groups on the polymer upon hydrolyzing in basic cement slurries to prevent polymer precipitation and a homopolymer of a monomer which hydrolyzes in basic cement slurries to generate anionic carboxylate groups that bind with calcium, viscosify the slurries and prevent settling in the slurries.

22 Claims, No Drawings

HIGH TEMPERATURE VISCOSIFYING AND FLUID LOSS CONTROLLING ADDITIVES FOR WELL CEMENTS, WELL CEMENT COMPOSITIONS AND METHODS

BACKGROUND OF THE INVENTION

1. Field of the Invention

The present invention relates to subterranean well cementing operations, and more particularly, to viscosifying and fluid loss controlling additives for use in well cements subjected to temperatures up to 500° F., well cement compositions containing the additives and methods of using the compositions.

2. Description of the Prior Art

Hydraulic cement compositions are commonly utilized in subterranean well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein which supports and positions the pipe string in the well bore and bonds the exterior surfaces of the pipe string to the walls of the well bore. Hydraulic cement compositions are also utilized in remedial cementing operations such as plugging highly permeable zones or fractures in well bores, plugging cracks or holes in pipe strings and the like.

Cement composition viscosifying additives are often used in well cement compositions to prevent settling of solids in the cement compositions after they are placed in a subterranean zone to be cemented. While such cement composition viscosifying additives have been utilized successfully at subterranean temperatures up to about 350° F., at higher temperatures the heretofore utilized viscosifying additives have not been able to prevent thermal thinning which results in the settling of solids in cement compositions. The settling of the solids in a cement composition results in defective cementing and failure of the set cement to provide zonal isolation.

Fluid loss control agents are also used in well cement compositions to reduce fluid loss from the cement compositions to permeable formations or zones into or through which the cement compositions are pumped. In primary cementing, the loss of fluid, i.e., water, to permeable subterranean formations or zones can result in premature gelation of the cement composition whereby bridging of the annular space between the permeable formation or zone and the pipe string being cemented therein prevents the cement composition from being placed over the entire length of the annulus.

Thus, there are needs for an improved viscosifying additive for well cements which can be utilized in cements subjected to temperatures up to 500° F. and which also provides fluid loss control to the cements at such temperatures, improved well cement compositions containing the additive and methods of using the cement compositions.

SUMMARY OF THE INVENTION

The present invention provides an improved viscosifying additive for use in well cement compositions subjected to temperatures up to 500° F. which also provides fluid loss control to the cement compositions, well cement compositions including the additive and methods of using the cement compositions which meet the needs described above and overcome the deficiencies of the prior art.

The viscosifying and fluid loss controlling additive of this invention for use in well cements at temperatures up to 500° F. is basically comprised of a mixture of a polymer and a homopolymer. The polymer is comprised of at least one monomer which is calcium tolerant, anionic and disperses basic cement slurries, at least one monomer which hydrolyzes in basic cement slurries to generate anionic carboxylate groups that bind with calcium and viscosify the slurries and at least one monomer which generates non-ionic pendant groups on the polymer upon hydrolyzing in basic cement slurries to prevent polymer precipitation, and a homopolymer of a monomer which hydrolyzes in basic cement slurries to generate anionic carboxylate groups that bind with calcium, viscosify the slurries and prevent settling in the slurries. The polymer preferably has a molecular weight in the range of from about 300,000 to about 1.5 million and the homopolymer preferably has a molecular weight in the range of from about 900,000 to about 1.5 million. The polymer is present in the mixture in an amount in the range of from about 50% to about 95% by weight of the mixture and the homopolymer is present therein in an amount in the range of from about 5% to about 50% by weight of the mixture.

The improved well cement compositions of this invention are basically comprised of a hydraulic cement, water present in an amount sufficient to form a slurry and a viscosifying and fluid loss controlling additive comprised of a mixture of a polymer and a homopolymer as described above.

The viscosifying and fluid loss controlling additive can be added in particulate solid form directly to the hydraulic cement or mix water utilized or it can be combined with water whereby a storable aqueous solution is formed which can be conveniently combined with the cement composition mix water.

The methods of this invention for cementing a zone in a subterranean formation penetrated by a well bore are basically comprised of the steps of preparing a cement composition of this invention including a viscosifying and fluid loss controlling additive comprised of a mixture of a polymer and a homopolymer as described above, placing the cement composition in the zone to be cemented and allowing the cement composition to set into an impermeable solid mass therein.

It is, therefore, a general object of the present invention to provide an improved high temperature viscosifying and fluid loss controlling additive for well cements, well cement compositions and methods of using the cement compositions.

Other and further objects, features and advantages of the present invention will be readily apparent to those skilled in the art upon a reading of the description of preferred embodiments which follows.

DESCRIPTION OF PREFERRED EMBODIMENTS

The viscosifying and fluid loss controlling additive of this invention is basically comprised of a mixture of a polymer and a homopolymer. The polymer is characterized in that it is obtained by polymerizing: (1) at least one monomer which is calcium tolerant, anionic and disperses basic cement slurries selected from 2-acrylamido-2-methylpropane sulfonic acid and its salts; vinyl sulfonate, allyl sulfonate or 3-allyloxy-2-hydroxy-1-propanesulfonic acid and its salts; (2) at least one monomer which is capable of hydrolyzing in basic cement slurries to generate anionic carboxylate groups that bind with calcium, viscosify the slurries and prevent settling in the slurries selected from acrylonitrile, acrylamide, N,N-dialkylacrylamide wherein the alkyl group is selected from $C_1$ to $C_6$ alkyl groups, N-vinylpyrrolidone, 2-acrylamido-2-methylpropane sulfonic acid and its salts or alkylacrylates such as methylmethacrylate and methylacrylate; and (3) at least one monomer which generates non-ionic pendant groups on the polymer upon hydrolysis in basic cement slurries to prevent polymer precipitation selected from N-alkyl-N-vinylalkanamides such as N-methyl-N-vinylacetamide, allyl glycidyl ether or vinylacetate. The molecular weight of the polymer is advantageously in the range of from about 300,000 to about 1.5 million, preferably about 500,000.

The ratio of the monomers in the polymer is selected such that when present in cement slurries, the polymer does not viscosify the slurries excessively under ambient conditions, but upon undergoing hydrolysis reactions in the cement slurries during placement, the polymer will continuously generate sufficient carboxylate groups at down hole temperatures to react with the calcium ions present in the slurries in cross-linking reactions and viscosify the slurries to counteract the thermal thinning of the slurries. Thus, the higher the down hole temperature, the greater the thermal thinning of cement slurries and the greater the rate of slurry viscosification due to carboxylate generating hydrolysis reactions.

The polymer, due to its adsorption on cement grains as well as due to its fluid viscosification properties, also provides fluid loss controlling properties. When the fluid loss control of slurries containing the polymer is not adequate, additional fluid loss controlling polymers can be added.

The preferred monomer ratio in the polymer depends on how the polymer affects the viscosities of cement slurries under ambient conditions as well as under down hole conditions. High viscosities under ambient conditions result in excessive pump pressures during the placement of the slurries. On the other hand, excessive dispersion of cement slurries at ambient temperature causes particle settling even before the slurries are placed in the well. The preferred ratio of the dispersing monomer or monomers from group 1 set forth above may vary from 30 to 60 percent by weight of the polymer; the anionic carboxylate generating monomer or monomer(s) of group 2 above may range from 20 to 60 percent by weight of the polymer; and the monomer or monomers from group 3 above may range from 0 to 40 percent by weight of the polymer. Most preferably, the monomer or monomers from group 1 are in the 40–50 percent range by weight of the polymer; the monomer or monomers of group 2 are present in the 30–40 percent range; and the group 3 monomer or monomers are in the 10–20 percent range by weight of the polymer.

It has been found that different homopolymers containing carboxylate generating monomers at different temperatures can be used in combination with the above described polymer. For example, it has been found that the polymer of the present invention can be used in a synergistic mixture with other homopolymers obtained by polymerizing one or more of the monomers listed in group 2 above. Thus for example, the above described polymer can advantageously be used in admixture with polyvinylpyrrolidone or polyacrylamide for preventing particle settling in cement slurries. The polymer is generally present in the mixture in an amount in the range of from about 50% to about 95% by weight of the mixture and the homopolymer or homopolymers used are present therein in an amount in the range of from about 5% to about 50% by weight of the mixture.

Viscosifying and fluid loss controlling polymers useful in accordance with this invention are available commercially. For example, polymers having the trade names "HOSTAMER V 4707™", "HOSTAMER 4706™" and "HOSTADRILL 2825™" are commercially available from the Clariant Corporation of Charlotte, N.C., and contain 2-acrylamido-2-methylpropane sulfonic acid, acrylamide and N-vinyl-N-alkylalknamide in proprietary ratios and are described in U.S. Pat. No. 4,587,283 issued to Hille et al. on May 6, 1986 which is incorporated herein by reference. A polymer containing multiple group 2 monomers with different hydrolysis rates is available under the trade designation "HE 300™" from Drilling Specialties Company of Bartlesville, Okla. The "HE 300™" polymer contains 2-acrylamido-2-methylpropane sulfonic acid, N-vinylpyrrolidone and acrylamide in a proprietary ratio. A homopolymer of vinylpyrrolidone having a molecular weight in the range of from about 900,000 to about 1.5 million is commercially available under the trade designation of "PVP K-90™" from ISP Technologies Incorporated of Wayne, N.J.

The viscosifying and fluid loss controlling additive of this invention can be combined in a solid particulate form with the hydraulic cement or mix water utilized to form a well cement composition. When the additive is utilized in offshore well cementing operations, the additive is preferably in liquid form. That is, the solid particulate polymer described above with at least one homopolymer described above can be combined with water in an amount sufficient to form an aqueous solution of the additive. The water used can be fresh water or salt water. The polymer and homopolymer mixture can be used effectively in combination with a separate fluid loss controlling additive as well as other well cement composition additives.

Thus, a preferred viscosifying and fluid loss controlling additive of this invention for use in well cement compositions subjected to temperatures up to 500° F. is comprised of a mixture of a polymer comprised of at least one monomer which is calcium tolerant, anionic and disperses basic cement slurries, at least one monomer which hydrolyzes in basic cement slurries to generate anionic carboxylate groups that bind with calcium and viscosify the slurries and at least one monomer which generates non-ionic pendant groups on the polymer upon hydrolyzing in basic cement slurries to prevent polymer precipitation and a homopolymer of a monomer which hydrolyzes in basic cement slurries to generate anionic carboxylate groups that bind with calcium, viscosify the slurries and prevent settling in the slurries.

The improved well cement compositions of the present invention are basically comprised of a hydraulic cement, sufficient water to form a slurry and a viscosifying and fluid loss controlling additive of the present invention as described above.

A variety of hydraulic cements can be utilized in accordance with the present invention including those comprised of calcium, aluminum, silicon, oxygen and/or sulfur which set and harden by reaction with water. Such hydraulic cements include, but are not limited to, Portland cements, pozzolana cements, gypsum cements, aluminous cements, silica cements and alkaline cements. Portland cements are generally preferred for use in accordance with the present invention. Portland cements of the types defined and described in *API Specification For Materials And Testing For Well Cements,* API Specification 10, 5$^{th}$ Edition, dated Jul. 1, 1990 of the American Petroleum Institute are particularly preferred. API Portland cements include Classes A, B, C, G and H. API Classes G and H are preferred with Class G being the most preferred.

The water utilized in the cement compositions of this invention can be fresh water, unsaturated salt solutions including brines and seawater and saturated salt solutions. Generally, the water can be from any source provided it does not contain an excess of compounds that adversely affect other components in the cement compositions. The water is present in the cement compositions of this invention in an amount sufficient to form a pumpable slurry. More particularly, the water is present in the cement compositions in an amount in the range of from about 38% to about 70% by weight of hydraulic cement therein, more preferably in an amount of about 60%.

The viscosifying and fluid loss controlling additive of this invention is included in the cement compositions of this invention in an amount in the range of from about 0.2% to about 7% by weight of hydraulic cement therein, more preferably in an amount in the range of from about 0.5% to about 3% and most preferably in an amount of 2%.

As mentioned above, the cement compositions containing the viscosifying and fluid loss controlling additive of this invention maintain viscosities at levels sufficient to prevent significant settling of particulate solids in the cement compositions at temperatures up to as high as 500° F. In addition, the additive provides fluid loss control to the cement compositions which often eliminates the need for one or more separate fluid loss control additives in the cement compositions.

As is well understood by those skilled in the art, various other cement composition additives can be utilized in the cement compositions of this invention including, but not limited to, additional fluid loss controlling agents, set retarding agents, set accelerating agents, fillers, weighting materials and the like.

A preferred well cement composition of this invention for use at temperatures up to about 500° F. is comprised of: a hydraulic cement; water present in an amount sufficient to form a slurry; and a viscosifying and fluid loss controlling additive comprised of a mixture of a polymer formed of at least one monomer which is calcium tolerant, anionic and disperses basic cement slurries, at least one monomer which hydrolyzes in basic cement slurries to generate anionic carboxylate groups that bind with calcium and viscosify the slurries and at least one monomer which generates non-ionic pendant groups on the polymer upon hydrolyzing in basic cement slurries to prevent polymer precipitation and a homopolymer of a monomer which hydrolyzes in basic cement slurries to generate anionic carboxylate groups that bind with calcium, viscosify the slurries and prevent settling in the slurries.

A more preferred well cement composition of this invention for use at temperatures up to about 500° F. is comprised of: a hydraulic cement; water present in an amount sufficient to form a slurry; and a viscosifying and fluid loss controlling additive having a molecular weight of about 500,000 comprised of a mixture of a polymer formed of 2-acrylamido-2-methylpropane sulfonic acid, acrylamide and N-alkyl-N-vinyl-acetamide monomers, the 2-acrylamido-2-methyl propane sulfonic acid monomer being present in the polymer in an amount in the range of from about 40% to about 50% by weight of the polymer, the acrylamide monomer being present in the polymer in an amount in the range of from about 30% to about 40% by weight of the polymer and the N-alkyl-N-vinyl-acetamide being present in an amount in the range of from about 10% to about 20% by weight of the polymer and a homopolymer of acrylamide having a molecular weight of about 1 million.

The methods of the present invention for cementing a subterranean zone penetrated by a well bore are basically comprised of the steps of providing a cement composition comprised of a hydraulic cement, water present in an amount sufficient to form a slurry and a viscosifying and fluid loss controlling additive comprised of a mixture of a terpolymer and a homopolymer as described above, placing the cement composition in the subterranean zone to be cemented and allowing the cement composition to set into an impermeable solid mass therein.

A preferred method of this invention for cementing a subterranean zone penetrated by a well bore is comprised of the steps of: (a) providing a cement composition comprising a hydraulic cement, water present in an amount sufficient to form a slurry and a viscosifying and fluid loss controlling additive comprised of a mixture of a polymer formed of at least one monomer which is calcium tolerant, anionic and disperses basic cement slurries, at least one monomer which hydrolyzes in basic cement slurries to generate anionic carboxylate groups that bind with calcium and viscosify the slurries and at least one monomer which generates non-ionic pendant groups on the polymer upon hydrolyzing in basic cement slurries to prevent polymer precipitation and a homopolymer of a monomer which hydrolyzes in basic cement slurries to generate anionic carboxylate groups that bind with calcium, viscosify the slurries and prevent settling in the slurries; (b) placing the cement composition in the subterranean zone; and (c) allowing the cement composition to set therein.

A more preferred method of this invention for cementing a subterranean zone penetrated by a well bore is comprised of the steps of: (a) providing a cement composition comprising a hydraulic cement, water present in an amount sufficient to form a slurry and a viscosifying and fluid loss controlling additive having a molecular weight of about 500,000 comprised of a mixture of a polymer formed of 2-acrylamido-2-methylpropane sulfonic acid, acrylamide and N-alkyl-N-vinyl-acetamide monomers, the 2-acrylamido-2-methyl propane sulfonic acid monomer being present in the polymer in an amount in the range of from about 40% to about 50% by weight of the polymer, the acrylamide monomer being present in the polymer in an amount in the range of from about 30% to about 40% by weight of the polymer and the N-alkyl-N-vinyl-acetamide being present in an amount in the range of from about 10% to about 20% by weight of the polymer and a homopolymer of acrylamide having a molecular weight of about 1 million; (b) placing the cement composition in the subterranean zone; and (c) allowing the cement composition to set therein.

In order to further illustrate the viscosifying and fluid loss controlling additive, well cement compositions and methods of the present invention, the following example is given.

EXAMPLE

Tests were conducted on well cement compositions containing the high temperature viscosifying and fluid loss controlling additive of this invention.

Cement Slurry No. 1 contained Portland Class A cement as the basic ingredient. The other ingredients present in Slurry No. 1 are shown in Table I. Cement Slurries Nos. 2 through 23 contained Portland Class H cement, silica flour in an amount of 35% by weight of cement and the other ingredients shown in Tables I and II. The basic cement slurries also contained viscosity increasing and settling preventing polymers as shown in Tables I and II.

Cement Slurries Nos. 24 through 33 contained Portland Class H cement, 40% silica flour by weight of cement and 5% fumed silica by weight of cement. The other additives in Cement Slurries Nos. 24 through 33 are listed in Table III. The cement retarders used in the tests are commercially available from Halliburton Energy Services of Duncan, Okla. under the trade names "FDP 601™" (lignosulfonate retarder), "SCR-100™" (a copolymer of 2-acrylamide-2-methylpropane sulfonic acid and acrylic acid), "SCR-500™" (a copolymer of 2-acrylamido-2-methylpropane sulfonic acid and itaconic acid), "HR-15™" (a mixture of lignosulfonate and tartaric acid), and "HR-5™" (sodium salt of lignosulfonate). The fluid loss control agents used are also commercially available as Halliburton products, namely "Halad 413™" (causticized lignite grafted with 2-acrylamido-2-methylpropane sulfonic acid, N,N-dimethylformamide and acrylonitrile) and "Halad 344™" (a copolymer of N,N-dimethylformamide and 2-acrylamido-2-methylpropane sulfonic acid). The transition time increasing additive, "GasStop HT™" (tannin grafted with acrylamide and 2-acrylamido-2-methylpropane sulfonic acid) is also available from Halliburton as is the settling preventing additive "SA-541™" (causticized hydroxypropyl guar surface treated with sodium borate).

Slurries Nos. 1 through 10 were tested at temperatures in the range of from 150° F. to 250° F. Slurries Nos. 11 through 23 were tested at temperatures in the range of from 300° F. to 400° F. and Slurries Nos. 24 through 33 were tested at a temperature of 434° F.

The viscosity, variation in density, set time, fluid loss and rheology tests were conducted utilizing the following procedures. All the tests were carried out on an instrument available from Halliburton Energy Services, Inc. under the trade name "MINI-MACS™." The "MINI-MACS™" instrument is capable of measuring the consistency (Bc or Bearden units), the viscosity, and the static gel strength of a cement slurry. A variable speed stepper motor drive and precision force transducer is used for stirring the slurry and measuring the consistence and static gel strength values. The motor speed is controlled to rotate a paddle inside the slurry container at 150 rpm for a standard API thickening time test and the initial placement conditioning for a static gel strength test. When in the static gel strength testing mode, the paddle is rotated at 0.2 degrees per minute.

The MINI-MACS™" instrument is rated for use at pressures up to 20,000 psi and temperatures up to 500° F. A heating rate of approximately 10° F./min is attainable. The test chamber is a two-part assembly that contains flow channels between the inside and outside portions that are used for cooling. This results in extremely fast cooling of the instrument after a testing is completed, even for high temperature tests. The API thickening time test provides the user with information on how long a slurry will remain pumpable during a cementing job. The instrument is one of the alternate apparatus for well simulation thickening time tests described in API RP10B, Twenty-Second Edition, December 1997, Appendix D. The instrument rotates the paddle inside the slurry cup instead of rotating the slurry cup as the traditional consistometer does. The static gel strength test is used to determine the gellation properties of a slurry when in a static mode. The test is normally started by stirring the slurry to simulate placement into a well bore and then the stirring stopped and placed in the static gel strength mode. During this time, the paddle is rotated at 0.2 degrees per minute (as near to static conditions as practical to obtain an indication of gellation)."

The tests were done in the thickening time test mode. If the slurry viscosity dropped to zero Bc long before the thickening time, the slurry was assumed to be vulnerable to settling. If a viscosity value of less than at least 5–10 Bc was maintained from the time the test temperature is reached until the set time, then the slurry was not expected to have settling problems. Frequently, it was noted that during the heating cycle, especially with gums surface-treated for delayed hydration, the slurry viscosity suddenly increased to values which are considered too high for pumping and dropped to near zero values after a few minut4s at high temperatures. In order for the slurry to be placed with reasonable pump pressures which do not exceed fracture gradients of the formation, slurries which maintain uniform viscosity through the entire length of slurry placement are desired. During the course of the experiment using "MINI-MACS™", Off/On cycles were programmed into the instrument computer program. During Off/On experiments, the stirring was stopped and started again in 5 minutes, and the cycle was repeated. When the stirring was started again, if the immediate viscosity was higher than that when the stirring was stopped, it was taken as an indication settling or severe gellation. If the immediate viscosity was the same as when the stirring was stopped, it was taken as a good sign indicating that the slurry was viscous and still flowable.

For selected slurries, the densities of different portions of set cement obtained from "MINI-MACS™" testing were measured to estimate the amount of settling. The fluid loss was measured either using a stirring high-temperature dynamic fluid loss cell for temperatures exceeding 180° F., or using the procedure described in API Specification 10, $5^{th}$ Edition dated Jul. 1, 1990 of the American Petroleum Institute. The rheology of the cement slurries was measured at room temperature using a Fann viscometer Model 35 manufactured by Fann Instruments of Houston, Tex.

A typical procedure is as follows for Slurry No. 30. A dry blend of Class H cement (600 grams), tannin grafted with acrylamide and 2-acrylamido-2-methylpropane sulfonic acid (4.8 grams), a copolymer of 2-acrylamido-2-methylpropane sulfonic acid and itaconic acid (12 grams), tartaric acid (12 grams), silica flour (240 grams), fumed silica (30 grams), polyvinylpyrrolidone (3 grams) and a terpolymer of 2-acrylamido-2-methylpropane sulfonic acid/acrylamide/N-vinyl-N-methylacetamide (3 grams) was mixed with tap water (372 grams) in a Waring blender under high shear according to API procedure. The slurry was transferred to the cell in the "MINI-MACS™" instrument and the heating cycle was set such that the test temperature (434° F.) was reached in 54 min. The stirring speed was 150 rpm. The final pressure at this temperature was 15,000 psi. After the test temperature was reached, the slurry viscosity was stabilized at 6 Bc. The slurry was allowed to set inside the cell at the test temperature. The device was cooled, the cement column was removed and chunks of the cement were removed with a drill. The densities of cement chunks from top, middle and bottom of the column were measured and were found to be 15.45, 15.33 and 15.32, respectively.

TABLE I

Viscosity, Set Time, Fluid Loss And Rheology At 150° F.–250° F. Range

| | | Cement Composition Components | | | | | | | | | | | |
|---|---|---|---|---|---|---|---|---|---|---|---|---|---|
| | Water, | Additive of the Present Invention | | Fluid Loss | | | | | | Lowest | | | |
| Slurry | % by wt. of | Polymer[1], % by wt. | Homopolymer[2], % by wt. | Control Additive[3] % by wt. | | Set Retarders | | | Temp., | Viscosity Before | Set Time, | Fluid Loss, | Rheology At |
| No. | cement | of cement | of cement | of cement | A[4] | B[5] | C[6] | D[7] | ° F. | Set, Bc | Hrs:Min | cc | 300-200-100-6-3 |
| 1 | 54.08 | 0.4 | — | 0.4 | 0.4 | — | — | — | 150 | — | — | 12 | 240-170-100-12-8 |
| 2 | 54.40 | 1.0 | — | 1.0 | — | — | — | — | 150 | 30 | 2:20 | n.d.[8] | n.d. |
| 3 | 54.24 | 1.0 | — | 1.0 | 0.2 | — | — | — | 150 | 25 | 9:30 | n.d. | 550-420-240-24-16 |
| 4 | 54.24 | 1.0 | — | 1.0 | 0.2 | — | — | — | 200 | 11 | 6:11 | n.d. | n.d. |
| 5 | 54.55 | 1.0 | — | — | 0.2 | — | — | — | 200 | 10 | 8:13 | n.d. | n.d. |
| 6 | 54.24 | 1.0 | — | 1.0 | 0.2 | — | — | — | 200 | 18 | 11:06 | n.d. | n.d. |
| 7 | 54.00 | 1.0 | — | 1.0 | 0.5 | — | 0.1 | — | 250 | 18 | 1:55 | n.d. | n.d. |
| 8 | 54.08 | 1.0 | — | 1.0 | 0.37 | — | 0.23 | — | 250 | 7 | 6:49 | n.d. | n.d. |
| 9 | 53.92 | 1.0 | — | 1.0 | 0.6 | — | 0.1 | — | 250 | 9 | 3:10 | n.d. | n.d. |
| 10 | 54.22 | 1.0 | — | 1.0 | — | — | — | 0.6 | 250 | 16 | 5:41 | n.d. | n.d. |

[1] 2-acrylamido-2-methylpropane sulfonic acid/acrylamide/N-vinyl-N-alkylalknamide polymer
[2] polyvinylpyrrolidone
[3] causticized lignite grafted with 2-acrylamido-2-methylpropane sulfonic acid, N,N-dimethylformamide and acrylonitrile
[4] Set Retarder A is lignosulfonate
[5] Set Retarder B is a copolymer of 2-acrylamido-2-methylpropane sulfonic acid and acrylic acid
[6] Set Retarder C is tartaric acid
[7] Set Retarder D is lignosulfonate and tartaric acid
[8] n.d. means not determined The results in Table I show that in the 150–200° F. temperature range, the terpolymer containing acrylamide is sufficient to prevent settling as seen in the good viscosity values of the slurry throughout the test period at the test temperatures.

The results in Table II for the temperature range 250–400° F. show that the polymers tested prevent settling of the particles as reflected in only small density variation in the set cement. In the temperature range, the homopolymer of vinylpyrrolidone was inadequate when used by itself as seen

TABLE II

Viscosity, Set Time, Set Cement Density Variation And Rheology At 300° F.–400° F. Range

| | | Cement Composition Components | | | | | | | | | | | |
|---|---|---|---|---|---|---|---|---|---|---|---|---|---|
| | Water, | Additive of the Present Invention | | Fluid Loss | | | | | | Lowest | | Variation in Density | Rheology |
| Slurry | % by wt. of | Polymer[1], % by wt. | Homo-polymer[2], % by wt. | Control Additive[3] % by wt. | | Set Retarders | | | Temp. | Viscosity Before | Set Time, | of Set Cement, | At 300-200-100- |
| No. | cement | of cement | of cement | of cement | A[4] | B[5] | C[6] | D[7] | ° F. | Set, Bc | Hrs:Min | ppg | 6-3, rpm |
| 11 | 53.58 | 1.25 | — | 1.0 | 1.0 | — | 0.4 | — | 300 | 3 | 11:21 | 0.27 | 600-540-328-40-28 |
| 12 | 53.98 | 1.25 | — | 1.0 | 0.5 | — | 0.25 | — | 300 | 10 | 3:47 | 0.37 | 600-480-300-44-30 |
| 13 | 53.98 | 1.25 | — | 1.0 | 0.5 | — | 0.3 | — | 300 | 16 | 4:41 | 0.17[9] | 570-420-260-40-24 |
| 14 | 53.98 | 1.25 | — | 1.0 | — | 1.0 | 0.4 | — | 300 | 10 | 5:05 | — | 520-400-236-30-20 |
| 15 | 53.98 | — | 1.25 | 1.0 | — | 1.0 | 0.4 | — | 300 | 7 | 4:37 | 0.51 | 460-340-216-24-16 |
| 16 | 53.76 | — | 1.25 | 1.0 | — | 1.5 | 0.75 | — | 300 | 2 | 15:23 | — | — |
| 17 | 54.17 | 1.25 | — | 1.0 | — | — | — | 0.8 | 300 | 15 | 2:30 | — | — |
| 18 | 54.08 | 1.25 | — | 1.0 | — | — | — | 1.1 | 300 | 12 | 5:18 | 0.37 | — |
| 19 | 54.01 | 1.56 | — | 1.25 | — | — | — | 1.1 | 300 | 21 | 7:01 | — | — |
| 20 | 54.08 | — | 1.25 | 1.0 | — | — | — | 1.1 | 300 | 0 | 6:54 | — | — |
| 21 | 54.40 | 1.25 | 1.0 | — | — | — | — | 1.1 | 300 | 9 | 6:32 | — | — |
| 22 | 53.68 | 1.56 | — | 1.25 | — | — | — | 2.25 | 400 | 14 | 2:04 | — | — |
| 23 | 53.76 | 1.56 | — | 1.25 | — | 1.75[8] | — | — | 400 | 16 | 4:21 | — | — |

[1] 2-acrylamido-2-methylpropane sulfonic acid/acrylamide/N-vinyl-N-alkylalknamide polymer
[2] polyvinylpyrrolidone
[3] causticized lignite grafted with 2-acrylamido-2-methylpropane sulfonic acid, N,N-dimethylformamide and acrylonitrile
[4] Set Retarder A is lignosulfonate
[5] Set Retarder B is a copolymer of 2-acrylamido-2-methylpropane sulfonic acid and acrylic acid
[6] Set Retarder C is tartaric acid
[7] Set Retarder D is lignosulfonate and tartaric acid
[8] Set Retarder B is 2-acrylamido-2-methylpropane sulfonic acid and itaconic acid instead of a copolymer of 2-acrylamido-2-methylpropane sulfonic acid and acrylic acid
[9] No free water, settling streaking or particle separation was detected by the zero viscosity value reached during the test. This is believed to be due to thermal thinning at intermediate temperatures prior to reaching the test temperature. When the homopolymer is used in combination with the terpolymer containing the easily hydrolyzable acrylamide, the slurry viscosities remained at levels at which settling does not occur. The results also show that by using a proper amount of the terpolymer in combination with additives which are not overly dispersing, the particulate settling can be effectively prevented.

selected from the group consisting of N-alkyl-N-vinylacetamide wherein the alkyl group is selected from $C_1$ to $C_6$ alkyl groups, allyl glycidyl ether, and vinylacetate; and a homopolymer of a monomer which hydrolyzes in basic cement slurries to generate anionic carboxylate groups that bind with calcium, viscosify the slurries and prevent settling in the slurries;

(b) placing said cement composition in said subterranean zone; and (c) allowing said cement composition to set therein.

TABLE III

Viscosity, Set Time And Set Cement Density Variation At 434° F.

| | | Additive of the Present Invention | | | Fluid Loss | Transition Time | Settling | | | | | | Variation In |
|---|---|---|---|---|---|---|---|---|---|---|---|---|---|
| Slurry No. | Water, % by wt. of cement | Polymer[1], % by wt. of cement | Polymer[2], % by wt. of cement | Homopolymer[3], % by wt. of cement | Control Additive[4], % by wt. of cement | Increasing Additive[5], % by wt. of cement | Preventing Additive[6], % by wt. of cement | Set Retarders | | | Lowest Viscosity Before Set, Bc | Set Time, Hr:Min | Density Of Set Cement Ppg |
| | | | | | | | | B[7] | C[8] | E[9] | | | |
| 24 | 62 | — | — | — | 1.2 | 0.8 | 0.5 | 1.0 | 0.5 | — | 0 | — | — |
| 25 | 62 | 1.0 | — | — | 1.2 | 0.8 | 0.5 | 2.0 | — | 0.2 | 0 | — | — |
| 26 | 62 | — | 1.0 | — | — | 0.8 | — | 2.0 | 2.0 | — | 3 | 9:00 | — |
| 27 | 62 | — | — | 1.0 | — | — | — | 2.0 | 2.0 | — | 0 | 7:20 | — |
| 28 | 62 | 1.0 | — | 1.0 | — | — | — | 2.0 | 2.0 | — | 0 | 26:00 | — |
| 29 | 62 | 0.5 | — | 0.5 | — | — | — | 2.0 | 2.0 | — | 5 | 2:20 | — |
| 30 | 62 | — | 1.0 | 1.0 | — | — | — | 2.0 | 2.0 | — | 1 | >7:00 | — |
| 31 | 62 | — | 0.5 | 0.5 | — | — | — | 2.0 | 2.0 | — | 6 | 2:30 | 0.3 |
| 32 | 62 | 0.5 | 0.5 | — | — | 0.8 | — | 2.0 | 2.0 | — | 2 | — | 1.1 |
| 33 | 62 | — | 1.0 | 1.0 | — | 0.8 | — | 2.0 | 2.0 | — | 5 | 7:00 | 0.22 |

[1] 2-acrylamido-2-methylpropane sulfonic acid/N-vinylpyrrolidone/acrylamide polymer
[2] 2-acrylamido-2-methylpropane sulfonic acid/acrylamide/N-vinyl-N-methylacetamide polymer
[3] Polyvinylpyrrolidone
[4] Causticized lignite grafted with 2-acrylamido-2-methylpropane sulfonic acid, N,N-dimethylformamide and acrylonitrile
[5] Tannin grafted with acrylamide and 2-acrylamido-2-methylpropane sulfonic acid
[6] Causticized hydroxypropylguar surface treated with sodium borate
[7] Set Retarder B is a copolymer of 2-acrylamido-2-methylpropane sulfonic acid and acrylic acid
[8] Set Retarder C is tartaric acid
[9] Copolymer of 2-acrylamido-2-methylpropane sulfonic acid and acrylic acid The results in Table III show that the proper combination of polymers which generate carboxylate groups by hydrolysis continuously over the entire temperature range will provide the slurry viscosification necessary to prevent particle settling at the test temperature.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:

(a) providing a cement composition comprising a hydraulic cement, water present in an amount sufficient to form a slurry and a viscosifying and fluid loss controlling additive comprising a mixture of a polymer comprised of at least one monomer which is calcium tolerant, anionic and disperses basic cement slurries, at least one monomer which hydrolyzes in basic cement slurries to generate anionic carboxylate groups that bind with calcium and viscosify the slurries, and at least one monomer which generates non-ionic pendant groups on the polymer upon hydrolyzing in basic cement slurries to prevent polymer precipitation 2. The method of claim 1 wherein said hydraulic cement in said composition is selected from the group consisting of Portland cements, pozzolana cements, gypsum cements, aluminous cements and silica cements.

3. The method of claim 1 wherein said hydraulic cement in said composition is Portland cement.

4. The method of claim 1 wherein said water in said composition is selected from the group consisting of fresh water, unsaturated salt solutions and saturated salt solutions.

5. The method of claim 1 wherein said water is present in said composition in an amount in the range of from about 38% to about 70% by weight of said hydraulic cement therein.

6. The method of claim 1 wherein said monomer in said viscosifying and fluid loss controlling additive which is calcium tolerant, anionic and disperses basic cement slurries is 2-acrylamido-2-methylpropane sulfonic acid or its salts.

7. The method of claim 1 wherein said monomer in said viscosifying and fluid loss controlling additive which hydrolyzes in basic cement slurries to generate anionic carboxylate groups which bind with calcium and viscosify the slurries is selected from the group consisting of acrylonitrile, acrylamide, N,N-dialkylacrylamide wherein the alkyl group is selected from $C_1$ to $C_6$ alkyl groups, N-vinylpyrrolidone, alkylacrylate wherein the alkyl group is selected from $C_1$ to $C_6$ alkyl groups and alkylmethylacrylate wherein the alkyl group is selected from $C_1$ to $C_6$ alkyl groups.

8. The method of claim 1 wherein said monomer in said polymer and in said homopolymer of said viscosifying and fluid loss controlling additive which hydrolyzes in basic cement slurries to generate anionic carboxylate groups which bind with calcium and viscosify the slurries is acrylamide.

9. The method of claim 1 wherein said monomer in said viscosifying and fluid loss controlling additive which generates non-ionic pendant groups on the polymer upon hydrolyzing in basic cement slurries to prevent polymer precipitation is N-alkyl-N-vinyl-acetamide.

10. The method of claim 1 wherein said monomer in said viscosifying and fluid loss controlling additive which is calcium tolerant, anionic and disperses basic cement slurries is present in said polymer in an amount in the range of from about 30% to about 60% by weight of said polymer.

11. The method of claim 1 wherein said monomer in said viscosifying and fluid loss controlling additive which hydrolyzes in basic cement slurries to generate anionic carboxylate groups which bind with calcium and viscosify the slurries is present in said polymer in an amount in the range of from about 20% to 60% by weight of said polymer.

12. The method of claim 1 wherein said monomer in said viscosifying and fluid loss controlling additive which generates non-ionic pendant groups on the polymer upon hydrolyzing in basic cement slurries to prevent polymer precipitation is present in said polymer in an amount in the range of from about 0 to 40% by weight of said polymer.

13. The method of claim 1 wherein said polymer in said viscosifying and fluid loss controlling additive is present in the mixture of said polymer with said homopolymer in an amount in the range of from about 50% to about 95% by weight of said mixture and said homopolymer is present therein in an amount in the range of from about 5% to about 50% by weight of said mixture.

14. The method of claim 1 wherein said polymer in said viscosifying and fluid loss controlling additive has a molecular weight in the range of from about 300,000 to about 1.5 million and said homopolymer therein has a molecular weight in the range of from about 900,000 to about 1.5 million.

15. The method of claim 1 wherein said viscosifying and fluid loss controlling additive is present in said cement composition in an amount in the range of from about 0.2% to about 7% by weight of hydraulic cement therein.

16. The method of claim 1 wherein said viscosifying and fluid loss controlling additive is present in said composition in an amount of about 2% by weight of hydraulic cement therein.

17. A method of cementing a subterranean zone penetrated by a well bore comprising the steps of:

(a) providing a cement composition comprising a hydraulic cement, water present in an amount sufficient to form a slurry and a viscosifying and fluid loss controlling additive comprising a polymer having a molecular weight of about 500,000 comprised of 2-acrylamido-2-methylpropane sulfonic acid, acrylamide and N-alkyl-N-vinyl-acetamide monomers, said 2-acrylamido-2-methyl propane sulfonic acid monomer being present in said polymer in an amount in the range of from about 40% to about 50% by weight of said polymer, said acrylamide monomer being present in said polymer in an amount in the range of from about 30% to about 40% by weight of said polymer and said N-alkyl-N-vinyl-acetamide being present in an amount in the range of from about 10% to about 20% by weight of said polymer and a homopolymer of acrylamide having a molecular weight of about 1 million;

(b) placing said cement composition in said subterranean zone; and (c) allowing said cement composition to set therein.

18. The method of claim 17 wherein said hydraulic cement is selected from the group consisting of Portland cements, pozzolana cements, gypsum cements, aluminous cements and silica cements.

19. The method of claim 17 wherein said hydraulic cement is Portland cement.

20. The method of claim 17 wherein said water is selected from the group consisting of fresh water, unsaturated salt solutions and saturated salt solutions.

21. The method of claim 17 wherein said water is present in said composition in an amount in the range of from about 38% to about 70% by weight of said hydraulic cement therein.

22. The method of claim 17 wherein said polymer in said viscosifying and fluid loss controlling additive is present in the mixture of said polymer with said homopolymer in an amount in the range of from about 50% to about 95% by weight of said mixture and said homopolymer is present therein in an amount in the range of from about 5% to about 50% by weight of said mixture.

* * * * *